Feb. 21, 1933. O. G. ALMCRANTZ 1,898,282
OUTLET BOX
Filed Jan. 4, 1929 2 Sheets-Sheet 1
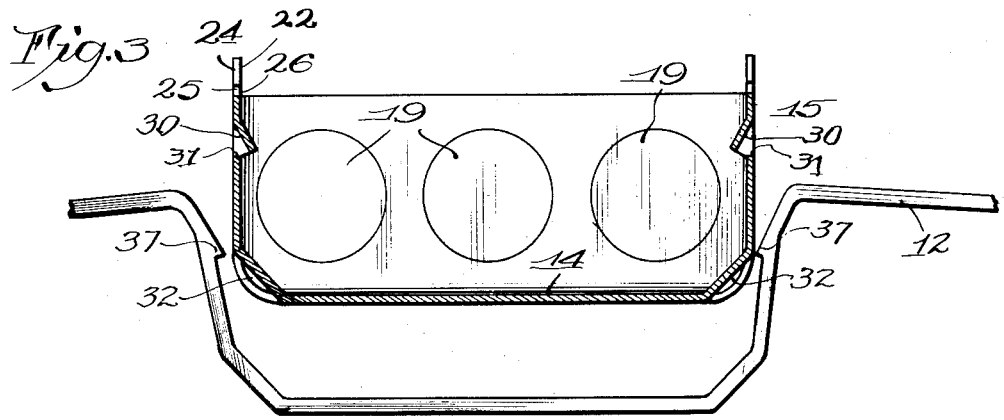
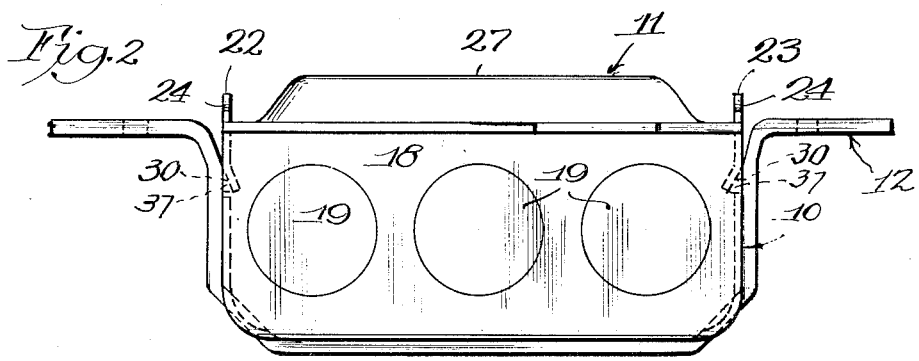
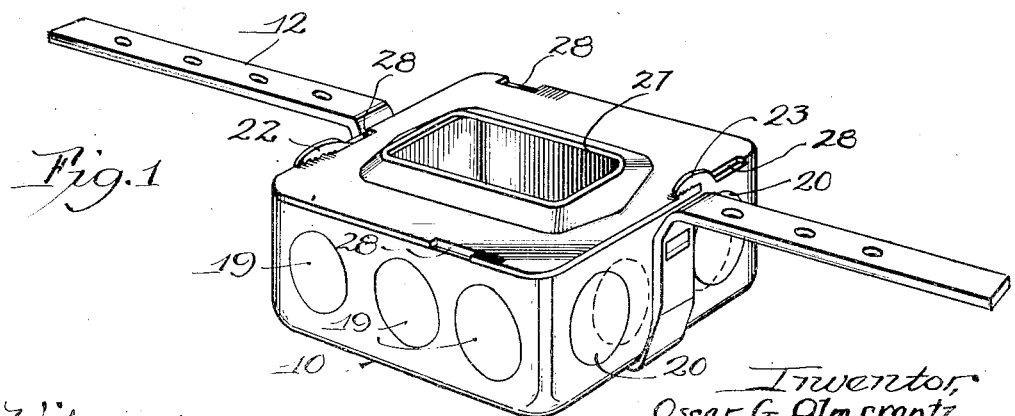
Inventor,
Oscar G. Almcrantz Feb. 21, 1933. O. G. ALMCRANTZ 1,898,282
OUTLET BOX
Filed Jan. 4, 1929 2 Sheets-Sheet 2
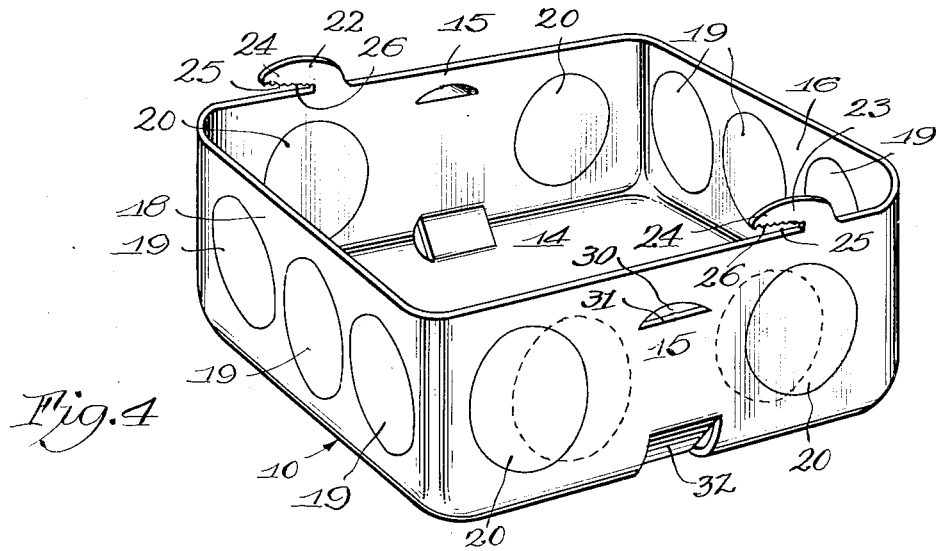
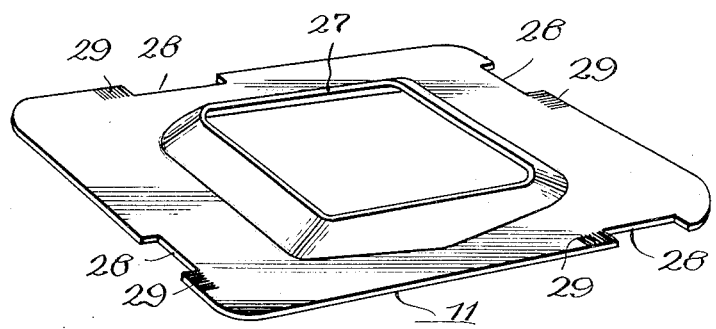
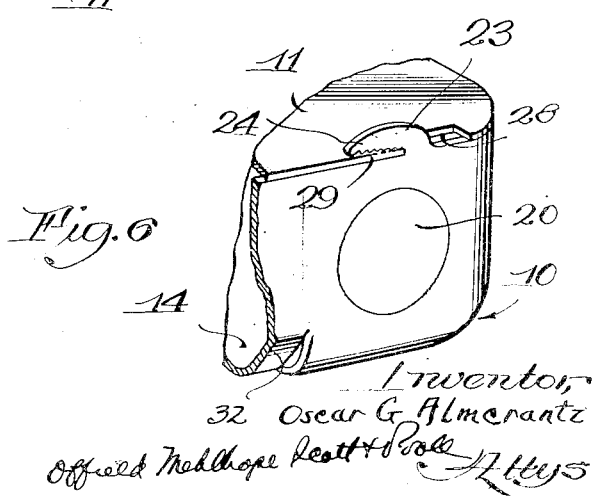
Inventor,
Oscar G. Almcrantz Patented Feb. 21, 1933

1,898,282

UNITED STATES PATENT OFFICE

OSCAR G. ALMCRANTZ, OF EVANSTON, ILLINOIS, ASSIGNOR OF ONE-HALF TO EDWARD L. KAPPELMAN, OF EVANSTON, ILLINOIS

OUTLET BOX

Application filed January 4, 1929. Serial No. 330,192.

This invention relates to improvements in electrical conduit outlet boxes and cleat hangers commonly used therewith, and has for its principal object to provide a new and improved construction of devices of the character described, whereby the parts are more economical in construction, are more readily assembled and afford increased utility as will hereinafter more fully appear.

The novel features of my invention are more particularly adapted for improvement of the outlet box commonly known as the "4-inch square box" and its cleat hanger.

As at present constructed this type of box is secured to the hanger by screwing thereto through the bottom of the box, the hanger being bent upwardly along the sides of the box and then extending therefrom substantially flush with the top, for connection to studding or the like. The box is provided with a plurailty of knock-outs arranged for ready removal, in the standard form, three knock-outs being provided on two opposite sides and two knock-outs on the remaining two sides. The number and position of the two knock-outs referred to are determined by the cover fastening utilized in this standard form of box, which fastening consists of two lugs or ears bent inwardly from the top margin of the box, and each having a threaded hole therein adapted to receive fastening screws for the cover. These ears are placed as near opposite corners as is practicable so as to permit interchangeable fitting of the cover, whereby the cover opening may be arranged either horizontally or vertically as required. By reason of the position of said ears, however, it is necessary to position the knock-outs relatively close together toward the center of the box in order to avoid interference of the cover fastening screws with the conduit bushings when inserted in said knock-outs. As a result, it is impossible to use the two knock-outs on the sides of the box adjacent the cover securing lugs when the hanger is attached to the box so that its inwardly bent portions extend between said knockouts, the reason for this being that the conduit nipples cannot be applied to the box without interfering with said hanger. In other words, the two knock-outs on the sides of the box which carry the cover connecting lugs cannot be used excepting when the box hanger is arranged so that it is turned at right angles thereto.

In carrying out my invention I provide an improved arrangement for connecting and assembling the hanger to the box without the use of screws or like securing devices, and also provide an improved form of cover connection for the box whereby the cover may be snapped upon the box without the use of screws. The improved construction and arrangement referred to permits the two knock-outs on the side of the box to which the hanger is normally secured to be spread apart more than formerly, so that either or both of said knock-outs can be utilized when the hanger is in place therebetween.

I also provide the cover with securing means whereby it may be rearranged with its opening disposed either vertically or longitudinally as required.

The invention may best be understood by reference to the accompanying drawings, in which Figure 1 is a perspective view of my improved outlet box, cover and hanger in assembled position.

Figure 2 is an enlarged view in side elevation of the parts shown in Figure 1, and illustrating in dotted lines the means for attaching the box to the hanger.

Figure 3 is a view showing the box in cross-section, and illustrating the method of springing the hanger so as to attach the box thereto.

Figure 4 is an enlarged perspective view of the box, with the hanger and cover removed.

Figure 5 is a perspective view of the cover, and

Figure 6 is an enlarged fragmentary detail showing the locking means for the box cover.

Referring now more particularly to details of the invention as embodied in the form shown in the drawings, the box body 10, cover 11 and hanger 12 together form a unit outlet member for use in connection with electrical conduits of the usual form.

The box 10 is square in shape, having a bottom 14 and four upright walls 15, 16, 17 and 18. The walls 16 and 18 are similar, each being provided with three semi-perforate indented portions 19, 19, commonly known as "knock-outs", designed to be readily displaced when it is desired to run conduit therethrough. The construction of said walls 16 and 18 and their three knock-outs is the same as that utilized in standard outlet boxes now manufactured.

The two upright walls 15 and 17 are mutually similar, and each is provided with two knock-outs 20, 20 disposed adjacent the corner of the box.

The securing means for the box cover 11 comprises lugs 22 and 23, each formed of an upstanding projection continuous with the side walls 15 and 17 respectively. Said lugs, however, are arranged adjacent diagonal corners of the box. Each lug is provided with a portion 24 overhanging the adjacent edge of its respective wall and forming an open slot 25. As seen in the drawings, the two slots 25, 25 face in the same direction. The under surfaces of the overhanging portions 24, 24 of said lugs are slightly divergent towards the open end of the slot and are preferably serrated or toothed crosswise thereof, as indicated at 26.

The cover 11 is of the usual square form having an opening 27, but differs from the standard construction in that it is provided with a series of four notches 28, 28, each notch being disposed near one corner thereof in position so that either diagonal pair of notches is adapted to register with the securing lugs 22 and 23, depending upon whether the cover is placed upon the box with its opening arranged vertically or horizontally. The cover is secured in place by passing the securing lugs 22 and 23 through the desired pair of notches 28, 28, so that the cover rests upon the upper margin of the box walls, and then forcing the cover longitudinally so that the portions 29, 29 of the cover adjacent the notches are forced into slots 25, 25. As shown herein, the portions 29, 29 are preferably serrated or toothed to correspond with the serrations 26, 26 on the securing lugs to assist in holding the parts together. This feature is also helpful in providing a tight electrically bonded connection between cover and box, since the teeth have a tendency to scrape off any paint on the serrated portions when the cover is snapped into place, thereby assuring a metal-to-metal connection which is usually desired in electrical devices of this character.

Referring now to the hanger and the securing means for the box, it will be seen that I provide the box with a series of indentations 30, 30 on the upper central portions of the walls 15 and 17, said indentations preferably being formed by cutting the lower edge of each indented portion so as to form a horizontal shoulder 31 on the side of the box. I also provide an indentation or notch 32 at the lower edge of each side wall 15 and 17 in alignment with the indentations 30, 30, said notches being of sufficient width to seat the hanger in fitting engagement therein.

The hanger 12 is bent in U-shape to fit the bottom and sides of the box, and is provided with a pair of projections 37, 37 adapted to engage the shoulders 31, 31. The lower angles of the hanger are also formed to fit in the indentations 32, 32, as clearly shown in Figure 2.

The box is secured in place by flexing or springing the U-shaped position of the hanger slightly, as indicated in Figure 3, so as to permit the box to be seated in place as the hanger is released. The box is thus held securely in place against twisting or displacement.

Among the advantages of the hanger unit above described is the ease and quickness with which the box may be secured to the hanger and the cover secured to the box, both operations being accomplished without screws, bolts or the like.

My improved attaching means for the cover also makes it possible to rearrange the adjacent knock-outs 20, 20 so they can be utilized when the hanger is in place between said knockouts, which is not possible in previous constructions in which the knock-outs were necessarily disposed too close to the hanger to permit their use when the hanger was applied therebetween.

The arrangement of the slotted lugs 22 and 23 also affords attachment of the cover in any one of four positions relative to the box. By reason of the friction engendered by the snapping on of the cover, a tight metal-to-metal connection is assured. The cover can also be detached, as required, by simply reversing the operation of attachment.

In addition to the advantages of the operation and construction above set forth, it will be observed that my improved form of outlet unit lends itself readily to economical manufacture. The box may be formed with substantially the same die operations as used with the standard form of box, but with the saving in the operation of bending the securing lugs inwardly, as has heretofore been required with the ordinary type of screw-attaching devices for the cover. The securing indentations 31 and notches 32 may be formed in the same operation that the knock-outs 20, 20 are formed. The hanger and cover are similarly simple and economical from a manufacturing standpoint.

Although I have illustrated and described the particular embodiment of my invention, it will be understood that I do not wish to be limited to the exact construction shown and described, but that various changes and modifications may be made without departing from the spirit and scope of my invention.

I claim as my invention:

1. In a conduit outlet unit, a box including a bottom and four upright walls, a cover for said box, and securing means therefor comprising two upstanding lugs on opposite walls provided with laterally opening slots, adapted to receive marginal portions of said cover in interlocking engagement by lateral movement of said cover, and serrated means on the engaging surfaces of said cover securing means to assure a metal-to-metal contact between said box and its cover.

2. In a conduit outlet unit, a square box including a bottom and four upright walls, a cover for said box having an elongated opening, and securing means for said cover comprising two upstanding lugs on opposite walls, but disposed adjacent diagonal corners, said lugs each being provided with laterally opening slots adapted to receive any two opposite marginal portions of said cover in interlocking engagement by lateral movement of said cover along the upper edges of said walls, and serrated means on the engaging surfaces of said cover securing means to assure a metal to metal contact between said box and its cover.

Signed at Chicago, Ill., this 29th day of December 1928.

OSCAR G. ALMCRANTZ.